(12) United States Patent
Mishima et al.

(10) Patent No.: US 7,898,614 B2
(45) Date of Patent: Mar. 1, 2011

(54) LIQUID CRYSTAL DISPLAY MODULE WITH FLEXIBLE PRINTED CIRCUIT BOARD, INSULATION SHEET AND REFLECTION SHEET

(75) Inventors: Yasuyuki Mishima, Mobara (JP);
Takahiro Ooshina, Mobara (JP); Shinji Murooka, Chiba (JP)

(73) Assignee: Hitachi Displays, Ltd., Chiba (JP)

( * ) Notice: Subject to any disclaimer, the term of this patent is extended or adjusted under 35 U.S.C. 154(b) by 164 days.

(21) Appl. No.: 11/971,936

(22) Filed: Jan. 10, 2008

(65) Prior Publication Data
US 2008/0225204 A1 Sep. 18, 2008

(30) Foreign Application Priority Data
Jan. 12, 2007 (JP) .................................. 2007-003979

(51) Int. Cl.
*G09F 13/04* (2006.01)
*G09F 13/08* (2006.01)
*G02F 1/1335* (2006.01)
*G02F 1/1345* (2006.01)

(52) U.S. Cl. ........... 349/65; 349/150; 362/97.2; 362/623

(58) Field of Classification Search .............. 349/65, 349/138, 150; 362/97.1–97.3, 623–626
See application file for complete search history.

(56) References Cited

U.S. PATENT DOCUMENTS

| 5,986,726 | A  | * | 11/1999 | Murai ............................. 349/59 |
| 6,417,897 | B1 | * | 7/2002  | Hashimoto .................... 349/65 |
| 6,549,263 | B1 | * | 4/2003  | Kim ............................... 349/58 |
| 2002/0008805 | A1 | * | 1/2002 | Kawakami et al. ........... 349/61 |
| 2005/0068472 | A1 | * | 3/2005 | Sung et al. ..................... 349/64 |
| 2005/0179850 | A1 | * | 8/2005 | Du ................................ 349/150 |
| 2005/0180124 | A1 | * | 8/2005 | Adachi et al. ................. 362/30 |
| 2006/0028594 | A1 | * | 2/2006 | Chou ............................ 349/58 |
| 2006/0139271 | A1 | * | 6/2006 | Okuda ........................... 345/88 |
| 2007/0000689 | A1 | * | 1/2007 | Ishimaru et al. ............. 174/255 |
| 2007/0002243 | A1 | * | 1/2007 | Kim ............................ 349/139 |

FOREIGN PATENT DOCUMENTS

JP 11-305228 11/1999

* cited by examiner

*Primary Examiner* — Mark A Robinson
*Assistant Examiner* — Michael Inadomi
(74) *Attorney, Agent, or Firm* — Antonelli, Terry, Stout & Kraus, LLP.

(57) ABSTRACT

The present invention provides a liquid crystal display module which can prevent the generation of display irregularities. The liquid crystal display module includes a liquid crystal display panel and a backlight device arranged on a back surface of the liquid crystal display panel. The backlight device is constituted of a light guide plate and a reflection sheet arranged on a back surface of the light guide plate. The liquid crystal display module includes a flexible printed circuit board having one end thereof mounted on the liquid crystal display panel and the other end thereof formed on a back side of the reflection sheet in an overlapping manner. An insulation sheet is arranged between the other end of the flexible printed circuit board and the reflection sheet.

9 Claims, 4 Drawing Sheets

LIQUID CRYSTAL DISPLAY MODULE WITH FLEXIBLE PRINTED CIRCUIT BOARD, INSULATION SHEET AND REFLECTION SHEET

CROSS-REFERENCE TO RELATED APPLICATIONS

The disclosure of Japanese Patent Application No. 2007-3979 filed on Jan. 12, 2007 including the specification, drawings and abstract is incorporated herein by reference in its entirety.

BACKGROUND

1. Field of the Invention

The present invention relates to a liquid crystal display module, and more particularly to a miniaturized liquid crystal display module such as a mobile phone.

2. Description of Related Art

Currently, a small-sized liquid crystal display panel having a size of approximately 2 inches to 4 inches has been used as a mobile phone. The mobile phone includes a liquid crystal display module which is constituted of a liquid crystal display panel and a backlight device arranged on a back surface of the liquid crystal display panel, and a casing for storing the liquid crystal display module.

Here, although there is no direct relationship with the invention, patent document 1 (JP-A-11 (1999)-305228) discloses a technique for fixing a reflection sheet using a double-sided adhesive tape.

SUMMARY

FIG. 5 is a perspective view showing the constitution of a conventional liquid crystal display module.

A liquid crystal display panel is constituted by overlapping a TFT substrate 11 and a color filter substrate 12 (hereinafter, referred to as a CF substrate) with a liquid crystal layer sandwiched therebetween. Further, on a portion of the TFT substrate 11 where the TFT substrate 11 and the CF substrate 12 do not overlap each other, a driver chip 13 for controlling driving of the liquid crystal display panel is formed. Further, for supplying signals to the driver chip 13, one end of a flexible printed circuit board 15 is arranged on the portion of the TFT substrate 11 where the TFT substrate 11 and the CF substrate 12 do not overlap each other. Further, a polarizer 14 is arranged on the CF substrate 12, and a polarizer is also arranged on the TFT substrate 11.

The liquid crystal display panel is arranged on an upper side of a frame-shaped mold frame 16. Further, on a lower side of the mold frame 16, optical sheets such as an upper diffusion sheet, an upper prism sheet, a lower prism sheet and a lower diffusion sheet not shown in the drawing, a light guide plate 17, and a reflection sheet 19 are arranged in a state that these optical sheets, the light guide plate 17 and the reflection sheet 19 are sandwiched between a portion of the other end of the flexible printed circuit board 15 described above and the mold frame 16. Here, on the other end of the flexible printed circuit board 15, a light source 18 such as an LED is arranged to face a side surface of the light guide plate 17 in an opposed manner.

FIG. 6 is a view showing a cross-sectional constitution of the conventional liquid crystal display module taken along a line A-A' in FIG. 5. FIG. 6 shows a state that the liquid crystal display module shown in FIG. 5 is stored in a space defined by an upper frame 21 and a lower frame 22. Further, FIG. 7 is a view showing a cross-sectional constitution of the conventional liquid crystal display module taken along a line B-B' in FIG. 5. FIG. 7 shows a state that the liquid crystal display module shown in FIG. 5 is stored in the space defined by the upper frame 21 and the lower frame 22 in the same manner as FIG. 6.

As shown in FIG. 6, the other end of the flexible printed circuit board 15 is arranged to overlap a portion of the reflection sheet 19. Further, as shown in FIG. 7, to the other end of the flexible printed circuit board 15, a pushing pressure is applied from below by the lower frame 22 made of metal, for example. It has been found that, due to such a pushing pressure, the other end of the flexible printed circuit board 15 is brought into contact with the reflection sheet 19, and as a result, the reflection sheet 19 is deflected thus generating display irregularities.

The invention has been made to overcome such drawbacks, and it is an object of the invention to provide a liquid crystal display module which can prevent the generation of display irregularities even when the liquid crystal display module having a relatively large display screen is stored in a casing having a relatively small storing space.

According to one aspect of the invention, there is provided a liquid crystal display module which includes a liquid crystal display panel and a backlight device arranged on a back surface of the liquid crystal display panel, wherein the backlight device is constituted of a light guide plate and a reflection sheet which is arranged on a back surface of the light guide plate, the liquid crystal display module includes a flexible printed circuit board having one end thereof mounted on the liquid crystal display panel and the other end thereof formed on a back side of the reflection sheet in an overlapping manner, and an insulation sheet arranged between the other end of the flexible printed circuit board and the reflection sheet.

Due to such a constitution, it is possible to provide a liquid crystal display module which can prevent the generation of display irregularities.

Further, in the liquid crystal display module, the insulation sheet has a thickness thereof set to a value not less than 20 μm and not more than 50 μm. Here, with respect to the thickness of the insulation sheet, when the thickness is set to a value not less than 30 μm and not more than 50 μm, it is possible to further expect the above-mentioned advantageous effect of the invention. The thickness of the insulation sheet is preferably set to a value not less than 35 μm and not more than 45 μm.

Further, in the liquid crystal display module, the other end of the flexible printed circuit board overlaps a portion of the reflection sheet, and the insulation sheet is arranged on the reflection sheet in a state that the insulation sheet gets over the other end of the flexible printed circuit board.

Further, in the liquid crystal display module, the insulation sheet is arranged on the reflection sheet in a state that the insulation sheet gets over the other end of the flexible printed circuit board by at least 10 mm or more.

It is considerable that the insulation sheet of the invention is preferably made of a material having a smooth surface such as polyethylene terephthalate sheet (PET sheet), for example.

Here, in the above-mentioned liquid crystal display module, the light source is arranged on the other end of the flexible printed circuit board, and the light source faces one side surface of the light guide plate in an opposed manner. Further, in the liquid crystal display module, optical sheets such as an upper diffusion sheet, an upper prism sheet, a lower prism sheet and a lower diffusion sheet are arranged between the light guide plate and the liquid crystal display panel.

According to the invention, it is possible to provide a liquid crystal display module which can prevent the generation of display irregularities.

DETAILED DESCRIPTION OF THE INVENTION

Figure 1:
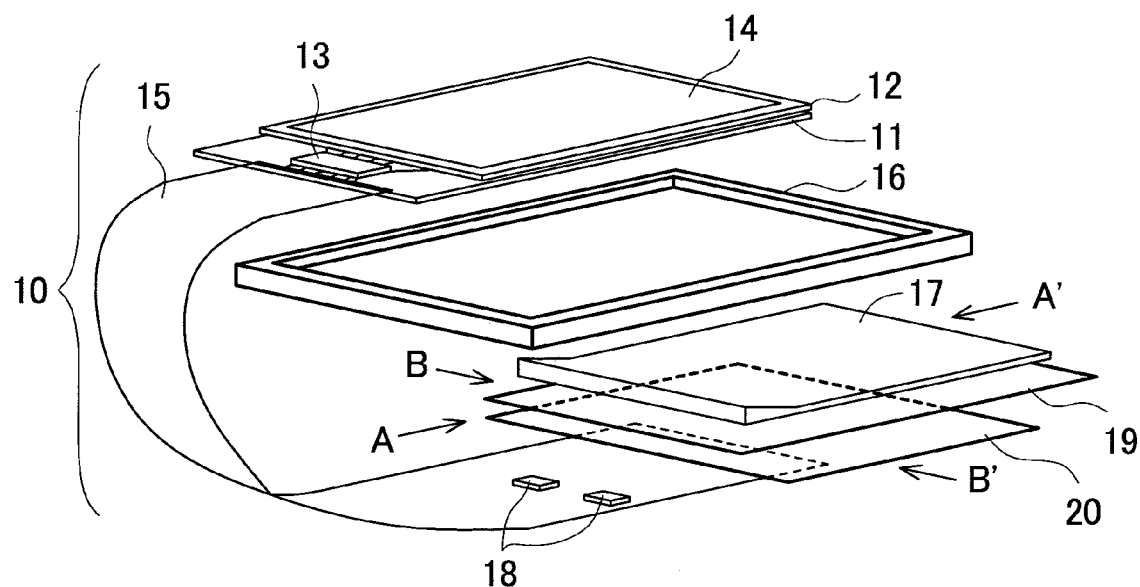
FIG. 1 is a view showing the constitution of a liquid crystal display module 10 according to the invention.

FIG. 1 shows the constitution of a liquid crystal display module 10 according to the invention.

A liquid crystal display panel is constituted by overlapping a TFT substrate 11 and a color filter substrate 12 (hereinafter, referred to as a CF substrate 12) formed of an insulative transparent substrate such as a glass substrate, a plastic substrate or the like, for example, with a liquid crystal layer sandwiched therebetween. Further, on a portion of the TFT substrate 11 where the TFT substrate 11 and the CF substrate 12 do not overlap each other, a driver chip 13 for controlling driving of the liquid crystal display panel is formed. Further, for supplying signals to the driver chip 13, one end of a flexible printed circuit board 15 is arranged on the portion of the TFT substrate 11 where the TFT substrate 11 and the CF substrate 12 do not overlap each other. Further, a polarizer 14 is arranged on the CF substrate 12, and a polarizer is also arranged on the TFT substrate 11. Here, for arranging the driver chip 13 on the TFT substrate 11, the CF substrate 12 is made smaller than the TFT substrate 11. It is needless to say that when the driver chip is arranged on the CF substrate 12, the CF substrate 12 is made larger than the TFT substrate 11 in size.

The liquid crystal display panel is arranged on an upper side of a frame-shaped mold frame 16. Further, on a lower side of the mold frame 16, optical sheets such as an upper diffusion sheet, an upper prism sheet, a lower prism sheet and a lower diffusion sheet not shown in the drawing, a light guide plate 17, and a reflection sheet 19 are arranged in a state that these optical sheets, the light guide plate 17 and the reflection sheet 19 are sandwiched between a portion of the other end of the flexible printed circuit board 15 described above and the mold frame 16. Here, on the other end of the flexible printed circuit board 15, a light source 18 such as an LED is arranged to face a side surface of the light guide plate 17 in an opposed manner.

The light guide plate 17 is arranged in a state that one side surface of the light guide plate 17 faces the light source 18 in an opposed manner, and the light guide plate 17 is stored in the mold frame 16 on a side opposite to a side of the mold frame 16 in which the liquid crystal display panel is stored. Further, the reflection sheet 19 arranged below the light guide plate 17 is adhered to the mold frame 16 using an adhesive agent applied to a periphery of the reflection sheet 19.

Figure 2:
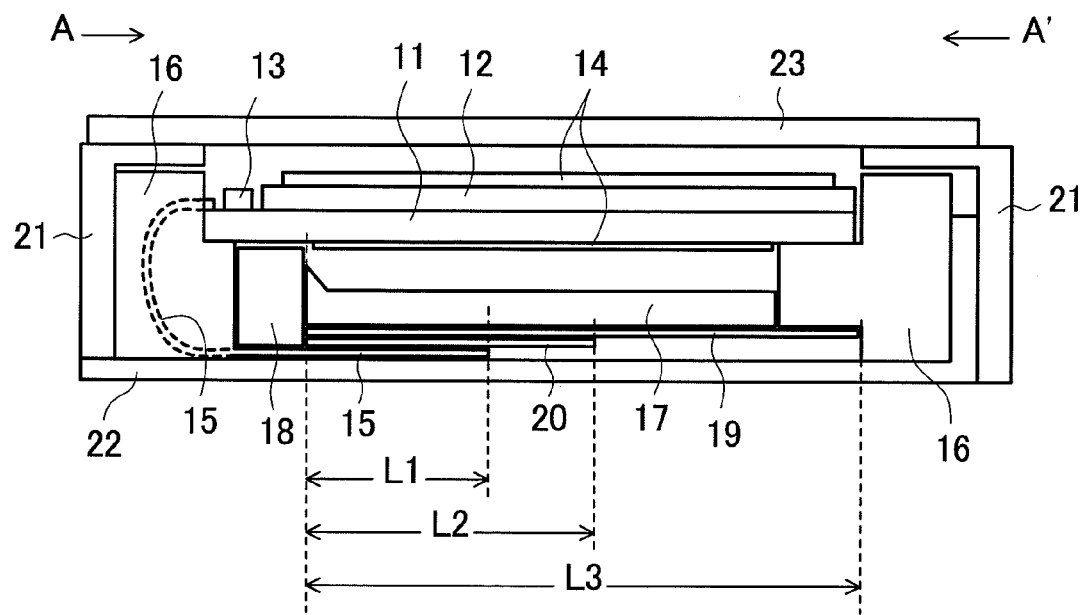
FIG. 2 is a view showing the cross-sectional constitution of the liquid crystal display module of the invention taken along a line A-A' in FIG. 1, and showing a state that the liquid crystal display module is stored in a space defined by an upper frame 21 and a lower frame 22.
Figure 3:
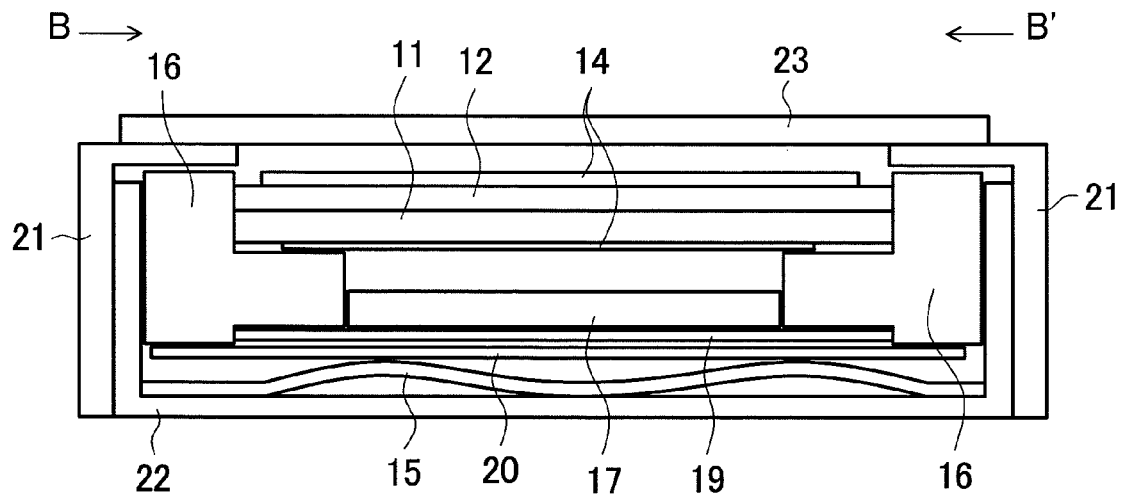
FIG. 3 is a view showing the conventional cross-sectional constitution of the liquid crystal display module taken along a line B-B' in FIG. 1, and showing a state that the liquid crystal display module is stored in a space defined by an upper frame 21 and a lower frame 22.

FIG. 2 shows the cross-sectional constitution of the liquid crystal display module of the invention taken along a line A-A' in FIG. 1. FIG. 2 shows a state that the liquid crystal display module shown in FIG. 1 is stored in a space defined by an upper frame 21 and a lower frame 22. Further, FIG. 3 shows the cross-sectional constitution of the conventional liquid crystal display module taken along a line B-B' in FIG. 1. FIG. 3 also shows a state that the liquid crystal display module shown in FIG. 1 is stored in the space defined by the upper frame 21 and the lower frame 22 in the same manner as FIG. 2.

As shown in FIG. 2, in the invention, the other end of the flexible printed circuit board 15 (a portion of the flexible printed circuit board 15 on which the light source 18 is arranged and which is arranged on a bottom surface of the lower frame 22) is configured to overlap a portion of the reflection sheet 19 having a length L3 and, further, an insulation sheet 20 is arranged between the other end of the flexible printed circuit board 15 and the reflection sheet 19.

FIG. 3 is the cross-sectional view taken along the line B-B' in FIG. 1 of the liquid crystal display module. As shown in FIG. 3, the other end of the flexible printed circuit board 15 is not brought into contact with the reflection sheet 19 directly but is brought into contact with the insulation sheet 20. By arranging such an insulation sheet 20, a pushing pressure applied to the reflection sheet 19 from the flexible printed circuit board 15 is alleviated or reduced and hence, it is possible to provide a liquid crystal display module having no display irregularities.

Figure 4:
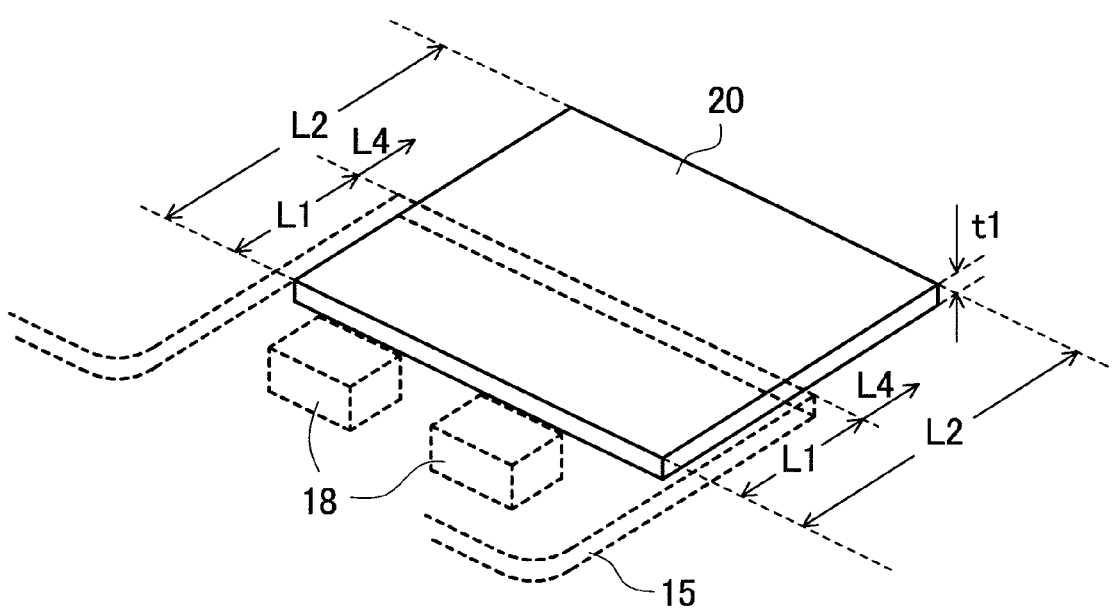
FIG. 4 is a view showing the constitution of an insulation sheet of the invention.
Figure 5:
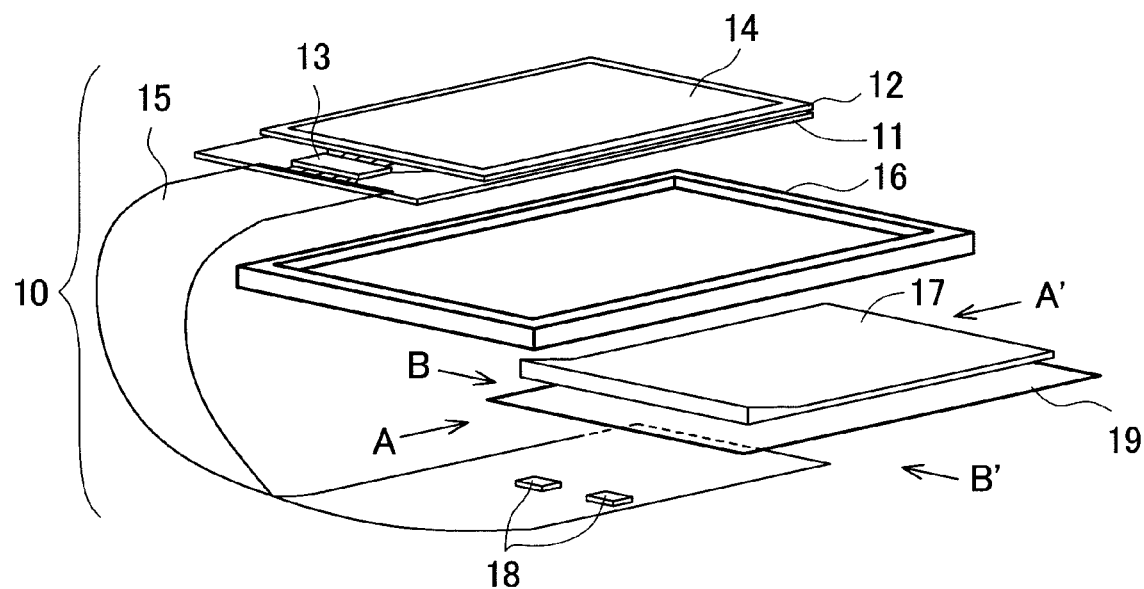
FIG. 5 is a perspective view showing the constitution of a conventional liquid crystal display module.
Figure 6:
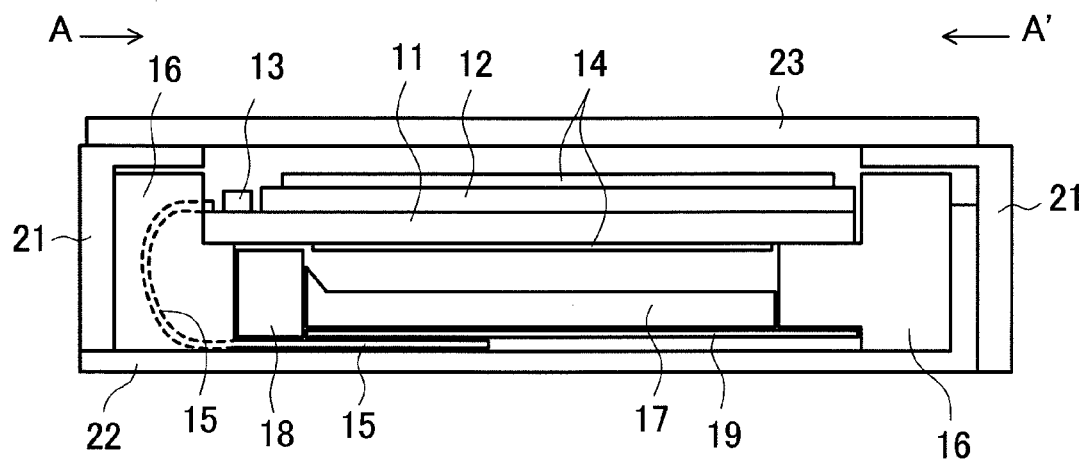
FIG. 6 is a view showing the cross-sectional constitution of the conventional liquid crystal display module taken along a line A-A' in FIG. 5, and showing a state that the conventional liquid crystal display module is stored in a space defined by an upper frame 21 and a lower frame 22.
Figure 7:
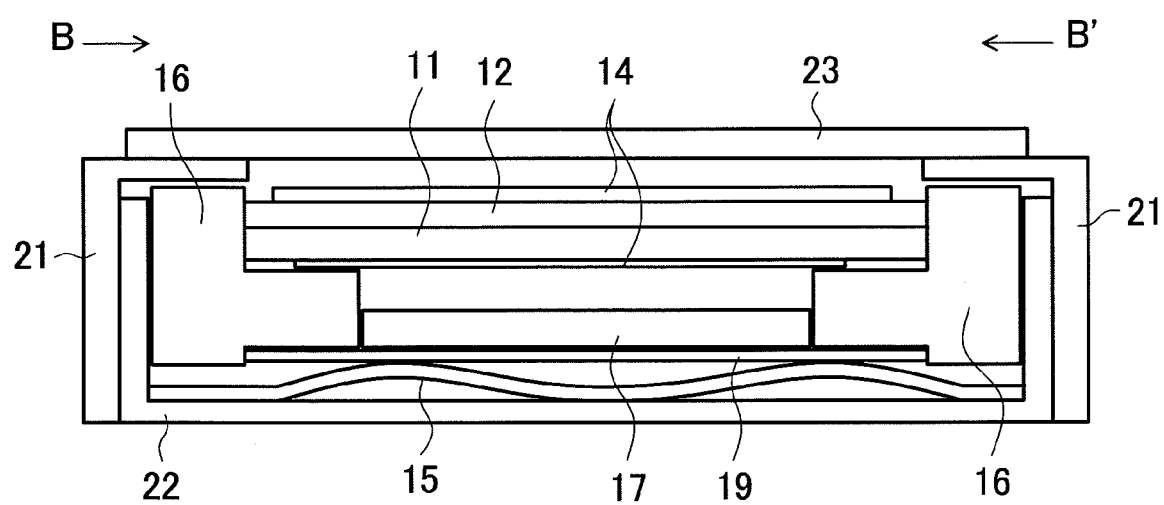
FIG. 7 is a view showing the cross-sectional constitution of the conventional liquid crystal display module taken along a line B-B' in FIG. 5, and showing a state that the conventional liquid crystal display module is stored in the space defined by the upper frame 21 and the lower frame 22.

The insulation sheet 20 of the invention is explained in detail in conjunction with FIG. 4.

FIG. 4 is a view showing the technique feature of the invention. FIG. 4 shows a state that the other end of the flexible printed circuit board 15 and the insulation sheet 20 arranged on the other end of the flexible printed circuit board 15.

The insulation sheet 20 may be formed of a member having a smooth surface such as a polyethylene terephthalate (PET) sheet, for example. To acquire an advantageous effect of the invention, that is, to satisfy a demand for the reduction of thickness of a liquid crystal display module in general, it is confirmed necessary to set a thickness t1 of the insulation sheet 20 to a value not less than 35 μm and not more than 45 μm to provide a liquid crystal display module having no display irregularities while satisfying the demand for the reduction of thickness. Here, by setting the thickness t1 to a value not less than 30 μm, it is possible to expect the advantageous effects of the invention to a considerable extent. Further, even when the thickness t1 is set to a value not less than 20 μm, it is possible to expect the above-mentioned advantageous effect that the display irregularities can be reduced to some extent. However, when the thickness t1 is set to a value less than 20 μm, that is, the thickness t1 becomes excessively small, the insulation sheet 20 no more plays a role of alleviating the pressure applied from the flexible printed circuit board 15 and hence, it is necessary to set the thickness t1 to 20 µm at minimum. Here, the larger the thickness t1 of the insulation sheet 20, the pressure applied from the flexible printed circuit board 15 can be alleviated more. However, the increase of the thickness t1 of the insulation sheet 20 is contrary to a demand for the reduction of thickness of the liquid crystal display module in general and hence, it is desirable to set the thickness t1 to the value not more than 40 µm. The thickness t1 of the insulation sheet 20 may be set to a value equal to or less than 60 µm at maximum.

Next, the insulation sheet 20 is arranged for alleviating the pressure applied to the reflection sheet 19 from the flexible printed circuit board 15 and hence, it is considered necessary to overlap the insulation sheet 20 to the other end of the flexible printed circuit board 15 (overlapping portion indicated by symbol L1 in FIG. 4) where the pressure is most remarkably applied. In the invention, although the insulation sheet 20 may be fixed by an adhesive agent or the like, to take a demand for the simple constitution and the role of the insulation sheet 20 to alleviate the pressure applied from the flexible printed circuit bard 15 into consideration, it is more preferable to freely insert the insulation sheet 20 between the flexible printed circuit board 15 and the reflective sheet 19 instead of fixing the insulation sheet 20 using an adhesive agent or the like. Accordingly, it is preferable that the insulation sheet 20 extends to the reflection sheet 19 in a state that the insulation sheet 20 gets over the other end of the flexible printed circuit board 15. That is, the insulation sheet 20 is preferably arranged on the reflection sheet 19 in a state that the insulation sheet 20 gets over the flexible printed circuit board 15 by at least not less than 10 mm (L4≧10 mm). Here, provided that a length L2 of the insulation sheet 20 satisfies the relationship of L2≧L4/2 with respect to a storing length L4 of the insulation sheet 20 in the mold frame 16, there is no possibility that the insulation sheet 20 is removed even when the insulation sheet 20 is freely held.

What is claimed is:

1. A liquid crystal display module comprising:
a liquid crystal display panel;
a backlight device arranged on a back surface of the liquid crystal display panel, the backlight device being constituted of a light guide plate and a reflection sheet arranged on a back surface of the light guide plate;
a flexible printed circuit board having one end thereof mounted on a surface of the liquid crystal display panel and an other end thereof disposed in an overlapping relation with respect to a back surface of the reflection sheet so that one surface of the other end of the printed circuit board faces one portion of the back surface of the reflection sheet;
an insulation sheet without wiring formed directly thereon is arranged between the one surface of the other end of the flexible printed circuit board and the back surface of the reflection sheet so as to at least enable contact between the insulation sheet and the one surface of the other end of the flexible printed circuit board; and
at least one LED is provided on a portion of the one surface of the other end of the flexible printed circuit board so as to face an edge of the light guide plate and to be adjacent to an edge of the reflection sheet and an edge of the insulation sheet;
wherein from the back surface of the light guide plate, the reflection sheet, the insulation sheet, and another portion of the other end of the flexible printed circuit board are arranged in this order;
wherein the insulation sheet is arranged in an overlapping relation to the one surface of the other end of the flexible printed circuit board and at least the one portion of the back surface of the reflection sheet in a state that the insulation sheet extends over another portion of the back surface of the one surface of the reflection sheet which adjoins the one portion thereof beyond an edge of the other end of the flexible printed circuit board; and
wherein the insulation sheet extends beyond the edge of the one surface of the other end of the flexible printed circuit board in overlapping relation with the back surface of the reflection sheet without extending to an edge of the reflection sheet in the extension direction of the reflection sheet from the at least one LED.

2. A liquid crystal display module according to claim 1, wherein a thickness of the insulation sheet is set to a value not less than 20 µm and not more than 50 µm.

3. A liquid crystal display module according to claim 2, wherein a thickness of the insulation sheet is set to a value not less than 30 µm and not more than 50 µm.

4. A liquid crystal display module according to claim 3, wherein a thickness of the insulation sheet is set to a value not less than 35 µm and not more than 45 µm.

5. A liquid crystal display module according to claim 1, wherein the insulation sheet extends beyond the edge of the one surface of the other end of the flexible printed circuit board by at least 10 mm or more.

6. A liquid crystal display module according to claim 1, wherein the insulation sheet is made of polyethylene terephthalate.

7. A liquid crystal display module according to claim 1, wherein the at least one LED is arranged on the other end of the flexible printed circuit board between the back surface of the liquid crystal display panel and the other end of the flexible printed circuit board, and the at least one LED is configured to face the one end of the light guide plate.

8. A liquid crystal display module according to claim 7, wherein an optical sheet is arranged between the light guide plate and the liquid crystal display panel.

9. A liquid crystal display module according to claim 1, wherein the insulation sheet is arranged between the one surface of the other end of the flexible printed circuit board and the back surface of the reflection sheet so as to at least reduce a pressure applied to the reflection sheet from the flexible printed circuit board and enable the liquid crystal display module to effect display without display irregularities.

* * * * *